Patented Feb. 7, 1950

2,496,319

UNITED STATES PATENT OFFICE 2,496,319

PREPARATION OF 2-PICOLINE SULFUR CONDENSATION PRODUCTS

Helen I. Thayer, Pittsburgh, Pa., assignor to Koppers Company, Inc., Pittsburgh, Pa., a corporation of Delaware No Drawing. Continuation of application Serial No. 665,638, April 27, 1946. This application February 26, 1948, Serial No. 11,317

7 Claims. (Cl. 260—290)

The present invention relates to condensation products of 2-picoline and sulphur, and to the process for their synthesis.

It is known to sulphurate mixtures of tar bases, for example, mixtures of pyridine and quinoline and their respective homologues. The so-obtained sulphurated mixtures of black pitch-like products have been used in the past without separation of individual ingredients. More recently it was found that all of the constituents of said tar bases do not react with sulphur. For example 3-picoline can be separated substantially unchanged when a close-boiling tar base mixture, comprising 3- and 4-picoline and 2,6-lutidine, is treated with sulphur or sulphur halides to condense the 4-picoline and 2,6-lutidine as a black insoluble mass.

It has now been found that when 2-, 3-, and 4-picolines are reacted with sulphur under similar temperature conditions, the reactions occurring and the products obtained are altogether different. The said reaction with 4-picoline and novel reaction product produced thereby is disclosed and claimed in an application of James L. Keller, Serial No. 536,280, filed May 19, 1944.

The primary object of the present invention is the provision of novel compounds that are the condensation reaction products of 2-picoline and sulphur.

Another object of the invention is the provision of a novel process for the synthesis of condensation products of sulphur and 2-picoline.

The invention has for further objects such other improvements as may be found to obtain in the processes and products hereinafter described or claimed.

The present invention comprises reacting 2-picoline with sulphur in the presence of small amounts of sodium hydroxide at elevated temperatures and the production thereby of a series of novel condensation products including the ultimate product of condensation $C_{36}H_{24}N_6S_2$ which is a bright orange-yellow solid and the intermediate condensation products, $C_{12}H_{12}N_2$ and $C_{18}H_{13}N_3$. Sym-di-(pyridyl-2) ethylene, a known compound, is also produced in small amounts as an intermediate condensation product of the reaction. The novel condensation product $C_{12}H_{12}N_2$ has been identified to be di-(pyridyl-2)-ethane. The above mentioned products are separated from the reaction mass by addition thereto of mineral acid, whereby the condensation products are dissolved and unreacted sulphur separated and filtered; the filtrate therefrom is partially neutralized with alkali metal hydroxide whereupon the condensation product $C_{36}H_{24}N_6S_2$ is then precipitated. The intermediate condensation products are salted out as an oil from the filtrate and then separated by distillation. It is important to the production of the aforesaid condensation products that the condensation reaction be performed at a temperature less than 200° C. and preferably between 155° and 165° C.

The products of invention can be useful in a number of different fields, for example, as intermediates in the preparation of other chemical compounds, such as pharmaceuticals, as valuable ingredients in pest control compositions, as inhibitors where materials are treated with acids, and as chemicals useful in the vulcanization of rubber.

The following is an example of operation of the novel process for producing the condensation products of invention. A mixture of 1000 grams of 2-picoline having a 2° boiling range, 500 grams of finely divided sulphur and 3.0 grams of sodium hydroxide was heated under reflux for 34 hours at a temperature between 155° and 165° C. Quantities of hydrogen sulphide were given off during the reaction. After cooling the reaction mixture, it was dissolved in 1200 ml. of 50% sulphuric acid and was filtered. The precipitate consisted chiefly of unreacted sulphur. The filtrate was then neutralized to a degree of mild acidity by gradual addition thereto of 2000 ml. of 50% sodium hydroxide, the temperature being maintained at 25° C. or less by artificial cooling. This neutralization effected a precipitation of orange-yellow solid, which was filtered from the mixture. Neutralization of the acid filtrate was continued until the mixture closely approached the neutral point, during which time the mixture was twice filtered for separation of further quantities of precipitate. The slightly acid filtrate was then made alkaline whereupon a brown oil separated. This oil is salted out of the aqueous solution by the presence therein of sodium sulphate formed by the acidification and neutralization steps. The separated oil and the aqueous alkaline layer were extracted with 1500 ml. of diethyl ether and the extract was subsequently dried.

The solid product obtained in the three filtrations was purified by reacidification and reprecipitation with alkali. It was then digested with ethyl alcohol and a bright yellow solid was separated by filtration therefrom. The yellow product can thereafter be purified by recrystallization from toluene, which was employed in the present example, or ethyl alcohol and carbon bisulphide. The product was analyzed for relative constituent weights and found to be as follows:

|  | Calculated Values | Average Found |
|---|---|---|
| Carbon | 71.49 | 71.66 |
| Hydrogen | 4.00 | 4.36 |
| Nitrogen | 13.90 | 14.03 |
| Sulphur | 10.60 | 9.84 |

The molecular weight was determined to be about 609. From the preceding determinations and from analogous organic reactions, it was determined that the product of condensation has the formula $C_{36}H_{24}N_6S_2$ with a melting point range of 200°–203.5° C.

The oily product in the ether extract was distilled at atmospheric pressure for removal of the ether, and then fractionally distilled under vacuum to provide a fraction containing 160.7 grams and boiling in the range of 164° to 180° C. under a vacuum of 15 mm. Hg absolute pressure, another fraction of 22 grams being sym-di(pyridyl-2) ethylene and boiling in the range of 186° to 212° C. (at 14 mm. Hg absolute pressure) and a third fraction of 122.8 grams boiling in the range of 215° to 255° C. at 2 mm. Hg. The relative weight of elements in the compound of the first fraction was found after purification by repeated recrystallizations to be as follows:

|  | Calculated Values | Average Found |
|---|---|---|
| Carbon | 78.22 | 78.54 |
| Hydrogen | 6.57 | 6.79 |
| Nitrogen | 15.21 | 14.85 |

This product, 161 grams of which were recovered, was determined to be the di-pyridyl ethane hereinbefore referred to and having a melting point range of 49.0 to 50.5° C.

The third fraction of 215°–255° C. boiling range at 2 mm. Hg was found by ultimate analysis to comprise the following by relative weights:

|  | Calculated Values | Average Found |
|---|---|---|
| Carbon | 79.68 | 79.48 |
| Hydrogen | 4.83 | 4.80 |
| Nitrogen | 15.49 | 15.77 |

Its molecular weight was determined to be 271.4 and it was concluded that the compound is of the formula, $C_{18}H_{13}N_3$. In purified state, it is a yellow crystalline solid having a melting point of 102.5 to 103° C. Its behavior demonstrates that the compound is a condensation of three picolines in an azole ring. Two moles of the compound when heated with a further quantity of sulphur condense with evolution of hydrogen sulphide to form the aforesaid sulphur-bearing condensation product $C_{36}H_{24}N_6S_2$. The reverse transformation can be accomplished by treating $C_{36}H_{24}N_6S_2$ with a reducing agent such as zinc and acid or dihydro-anthracene.

The invention as hereinafter set forth is embodied in particular form and manner but may be variously embodied within the scope of the claims hereinafter made.

The present application is a continuation of my application Serial No. 665,638, filed April 27, 1946, now abandoned.

I claim:

1. A process of producing novel condensation products of 2-picoline and sulphur, comprising: heating a mixture of 2-picoline and sulphur to form condensation products comprising a mixture of individual sulfurated and nitrogenated heterocyclic compounds; dissolving the crude reaction product in acid and separating acid-insoluble material from acid solution; neutralizing the acid solution by a plurality of additions thereto of an alkali and thereby separating one condensation product; after complete neutralization, extracting an oily product from the neutralized solution; fractionally distilling the so-separated oily product and recovering nitrogenated hydrocarbons as pure products.

2. A process of producting novel condensation products of 2-picoline and sulphur, comprising: heating a mixture of 2-picoline and sulphur at a temperature between 155° and 165° C. for about 24 to 30 hours to form condensation products comprising a mixture of individual sulfurated and nitrogenated heterocyclic compounds; dissolving the crude reaction product in acid and separating acid-insoluble material from acid solution; neutralizing the acid solution by a plurality of additions thereto of an alkali and thereby separating one condensation product; after complete neutralization, extracting an oily product from the neutralized solution; fractionally distilling the so-separated oily product and recovering nitrogenated hydrocarbons as pure products.

3. A process of producing novel condensation products of 2-picoline and sulphur, comprising the steps of heating a mixture of 2-picoline and sulphur at a temperature between 155° and 165° C. for about 24 to 30 hours and separating pure products from the reaction mass produced thereby.

4. A process of producing novel condensation products of 2-picoline and sulphur, comprising: heating a mixture of 2-picoline and sulphur to form condensation products comprising a mixture of individual sulfurated and nitrogenated heterocyclic compounds; dissolving crude product in acid and separating acid-insoluble material from acid solution; partially neutralizing the acid solution and thereby precipitating a condensation product; and recrystallizing the condensation product from a suitable solvent and obtaining an orange-yellow crystalline product having a melting point of 200°–203.5° C. and the formula $C_{36}H_{24}N_6S_2$.

5. A process of producing novel condensation products of 2-picoline and sulphur, comprising: heating a mixture of 2-picoline and sulphur at a temperature between 155° and 165° C. for about 24 to 30 hours to form condensation products comprising a mixture of individual sulfurated and nitrogenated heterocyclic compounds; dissolving crude product in acid and separating acid-insoluble material from acid solution; partially neutralizing the acid solution and thereby precipitating a condensation product; recrystallizing the precipitated condensation product from a suitable solvent and obtaining an orange-yellow crystalline product having a melting point of 200°–203.5° C. and the formula $C_{36}H_{24}N_6S_2$; completing neutralization of the said solution and thereby salting out an oily mixture of condensation products; extracting the oily mixture from the said solution; and thereafter fractionally distilling the extracted oil to recover condensation products including sym-di-(pyridyl-2) ethane.

6. A process of producing novel condensation products of 2-picoline and sulphur, comprising: heating a mixture of 2-picoline and sulphur at a temperature between 155° and 165° C. for about 24 to 30 hours to form condensation products comprising a mixture of individual sulfurated and nitrogenated heterocyclic compounds; dissolving crude product in acid and separating acid-insoluble material from acid solution; partially neutralizing the acid solution and thereby precipitating a condensation product; recrystallizing the precipitated condensation product from a suitable solvent and obtaining an orange-yellow crystalline product having a melting point of 200–203.5° C. and the formula $C_{36}H_{24}N_6S_2$; completing neutralization of the said solution and thereby salting out an oily mixture of condensation products; extracting the oily mixture from the said solution; and thereafter fractionally distilling the extracted oil to recover condensation products including sym-di-(pyridyl-2) ethane and a compound having the formula $C_{18}H_{13}N_3$, a melting point range of 102.5° to 103° C., and a conformation of three picoline structures composing conjointly a ring.

7. A 2-picoline condensation product of melting point range 200° to 203.9° C. and a molecular weight of about 609 produced by condensing a mixture of 2-picoline and sulphur when heated to a temperature of 155° to 165° C. for a period of 24 to 30 hours, dissolving the condensate product in acid and filtering off the acid-insoluble material, neutralizing the filtrate to precipitate the condensation product and recrystallizing the condensation product with a solvent.

HELEN I. THAYER.

REFERENCES CITED

The following references are of record in the file of this patent:

UNITED STATES PATENTS

| Number | Name | Date |
|---|---|---|
| 2,198,961 | Dietrich | Apr. 30, 1940 |